United States Patent

Sebestyen

[11] Patent Number: 5,918,407
[45] Date of Patent: Jul. 6, 1999

[54] DELAYED ACTION FISHING SPOOL

[76] Inventor: Thomas Sebestyen, 3009 North 57th Dr., Hollywood, Fla. 33021

[21] Appl. No.: 08/928,263
[22] Filed: Sep. 12, 1997
[51] Int. Cl.⁶ .................................................... A01K 91/00
[52] U.S. Cl. ............................................ 43/43.11; 43/27.4
[58] Field of Search ........................... 43/20, 27.4, 43.11; 242/309, 406

[56] References Cited

U.S. PATENT DOCUMENTS

| 3,499,242 | 3/1970 | Tucker, Sr. | 43/43.11 X |
| 3,500,575 | 3/1970 | Klemkowski | 43/43.11 |
| 3,629,966 | 12/1971 | Sanchez | 43/43.11 X |
| 4,651,459 | 3/1987 | Wurtz | 43/15 |
| 5,074,072 | 12/1991 | Serocki et al. | 43/17 |
| 5,239,769 | 8/1993 | Anderson | 43/43.11 |
| 5,570,534 | 11/1996 | Ford | 43/19.2 |

FOREIGN PATENT DOCUMENTS 737852  10/1955  United Kingdom .

Primary Examiner—Robert P. Swiatek
Attorney, Agent, or Firm—Richard C. Litman

[57] ABSTRACT

A delayed action fishing spool primarily for use with a fishing rig when trolling, including a fishing line release clip that holds the fishing line with only enough force to overcome the drag created by the lure being pulled through the water. Once a fish is hooked, the tension on the line increases, and the line is released. When the fishing line release clip lets go of the fishing line, a predetermined amount of line is immediately released from the spool, in the direction of the axis of the spool. The spool is supported by an adjustable mount that permits horizontal and vertical movement of the spool. In use, the fishing line is played out behind a boat to the desired trolling distance. A predetermined amount of fishing line is wrapped around the spool then, the line is set into place within the release clip. The predetermined amount of fishing line allows the fish to "run" with the bait, prior to tension being applied by the fishing tackle itself. By reducing the initial tension on the line, the fish will be given enough time to swallow the bait and become hooked prior to normal fishing tension being applied by the fishing reel.

14 Claims, 3 Drawing Sheets

DELAYED ACTION FISHING SPOOL

BACKGROUND OF THE INVENTION

1. Field of the Invention

The present invention relates to a delayed action fishing spool which is used predominately for trolling. More specifically, the fishing spool is mounted to a fishing boat and provides a predetermined amount of slack in a fishing line, to allow a fish to become hooked on the fishing line prior to tension being applied to the line.

2. Description of the Related Art

Devices exist that control the amount of tension in a fishing line, to more securely set a fishing hook in a fish. The prior art devices, however, tend to "snap-set" a fishing hook once the presence of a fish is detected on the line. In contrast, the present invention allows a certain predetermined amount of line to be paid out without resistance. This enables the fish to at least partially swallow the bait prior to any tension being applied to the line (by the fishing tackle itself).

U.S. Pat. No. 4,651,459 issued on Mar. 24, 1987 to Wurtz, shows an automatic fishing device wherein a length of line is wound around a rotatably mounted spool and plays out as the fish hits the baited hook. A tensioned trip element causes the spool to automatically start rewinding the fishing line thereby setting the hook, and reeling in the fish. This device, however, has an inherent, initial tension on the line caused by the rotational friction in the bearings of the spool, is not designed to be used with existing tackle, and is complex and therefore expensive to manufacture.

U.S. Pat. No. 5,074,072 issued on Dec. 24, 1991 to Serocki et al., discloses a folding tip-up that includes a length of fishing line wound about a spool. When the spool rotates as a fish pulls on the line, the sensed bite is announced visually and audibly. As with the Wurtz device, there is tension on the line caused by the rotational friction in the bearings of the spool, and the device is not designed to be used with existing tackle.

U.S. Pat. No. 5,570,534 issued on Nov. 5, 1996 to Ford teaches a fishing rod jigger and automatic hook setting device that can be used with existing tackle. This device sets a hook by applying tension as soon as a fish is detected on the hook, in contrast to the present invention.

British Patent Specification No. 737,852, published Oct. 5, 1955 discloses a fishing line reeling apparatus wherein a length of line is wound around a rotatably mounted drum and plays out thereby turning the drum as the fish pulls on the line. The spool automatically starts rewinding the fishing line thereby reeling in the fish. As with the Wurtz device, however, there is an inherent, initial tension on the line caused by the rotational friction in the bearings of the drum, the device is not designed to be used with existing tackle, and is complex and therefore expensive to manufacture.

None of the above inventions and patents, taken either singularly or in combination, is seen to describe the instant invention as claimed. Thus a delayed action fishing spool solving the aforementioned problems is desired.

SUMMARY OF THE INVENTION

The delayed action fishing spool of the present invention is primarily for use with a fishing rig when trolling. In trolling, a fishing line having a lure and hook on one end thereof is pulled behind a boat at a slow speed (usually by having the boat in trolling gear). In conventional fishing tackle, the drag setting on the fishing reel is set to a point wherein the tension in the line created by the trolling does not unwind the reel, but increased tension on the line from a hooked fish will unwind the reel. Unfortunately, if this setting is too light, the line will become entangled, and if it is too tight, the fish will feel the tension and release the bait. The delayed action fishing spool of the present invention overcomes this problem by using a fishing line release clip that holds the fishing line with only enough force to overcome the drag created by the lure being pulled through the water. Once a fish is hooked, the tension on the line increases, and the line is released.

A predetermined amount of the fishing line is wrapped around a non-rotating, fishing line spool. When the fishing line release clip lets go of the fishing line, this predetermined amount of line is immediately released from the spool. The immediate release is facilitated by the spool's orientation with respect to the trolling direction. This orientation is similar to an open-faced reel, wherein the line is released in the direction of the axis of the spool. In order to maintain this orientation, the spool is supported by an adjustable mount that permits horizontal and vertical movement of the spool.

In use, the fishing line is played out behind a boat to the desired trolling distance. The predetermined amount of fishing line is then wrapped around the spool. The line is then set into place within the release clip, thereby holding it in place. The predetermined amount of fishing line limits the distance a fish is allowed to "run" with the bait, prior to tension being applied by the fishing tackle itself. The fishing line release clip also includes an adjustment mechanism to change the tension required to release the line.

Accordingly, it is a principal object of the invention to provide a fishing rig that will allow a predetermined amount of fishing line to be released prior to normal fishing tension being applied to a fishing line.

It is another object of the invention to provide a device that can adjust the level of tension needed to release a predetermined amount of fishing line from a fishing rig.

It is a further object of the invention to allow a fish to "run" with a fishing lure a predetermined distance prior to applying tension to a fishing line, to thereby increase the probability of catching the fish.

It is an object of the invention to provide improved elements and arrangements thereof in a delayed action fishing spool for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
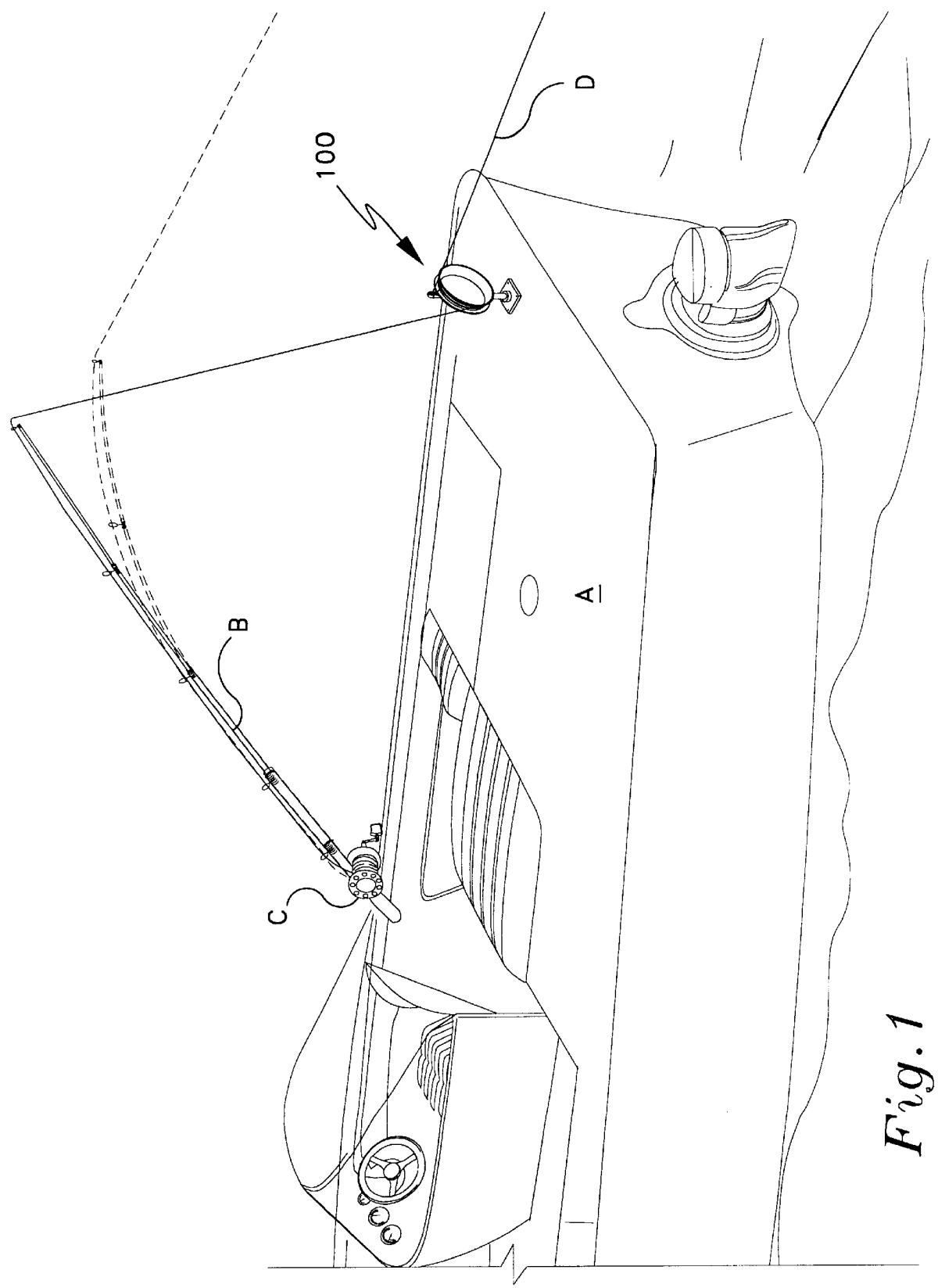
FIG. 1 is an environmental view of a delayed action fishing spool being used to troll fish on the rear of a boat according to the present invention.

The present invention is a delayed action fishing spool primarily for use when trolling. FIG. 1 shows the delayed action fishing spool 100 being used as part of a fishing rig combination while trolling from the rear of a boat A. The fishing rig includes: a fishing pole B; a fishing reel C; a fishing line D; and the delayed action fishing spool 100 of the present invention. As with conventional fishing tackle, the fishing line D has a first end with a hook and bait (not shown), and a second end wound about and attached to the fishing reel C. Contrary to conventional tackle, in the fishing rig combination of FIG. 1, the fishing line D is routed from the pole B through the delayed action fishing spool 100 and into the water behind the boat A.

Figure 2:
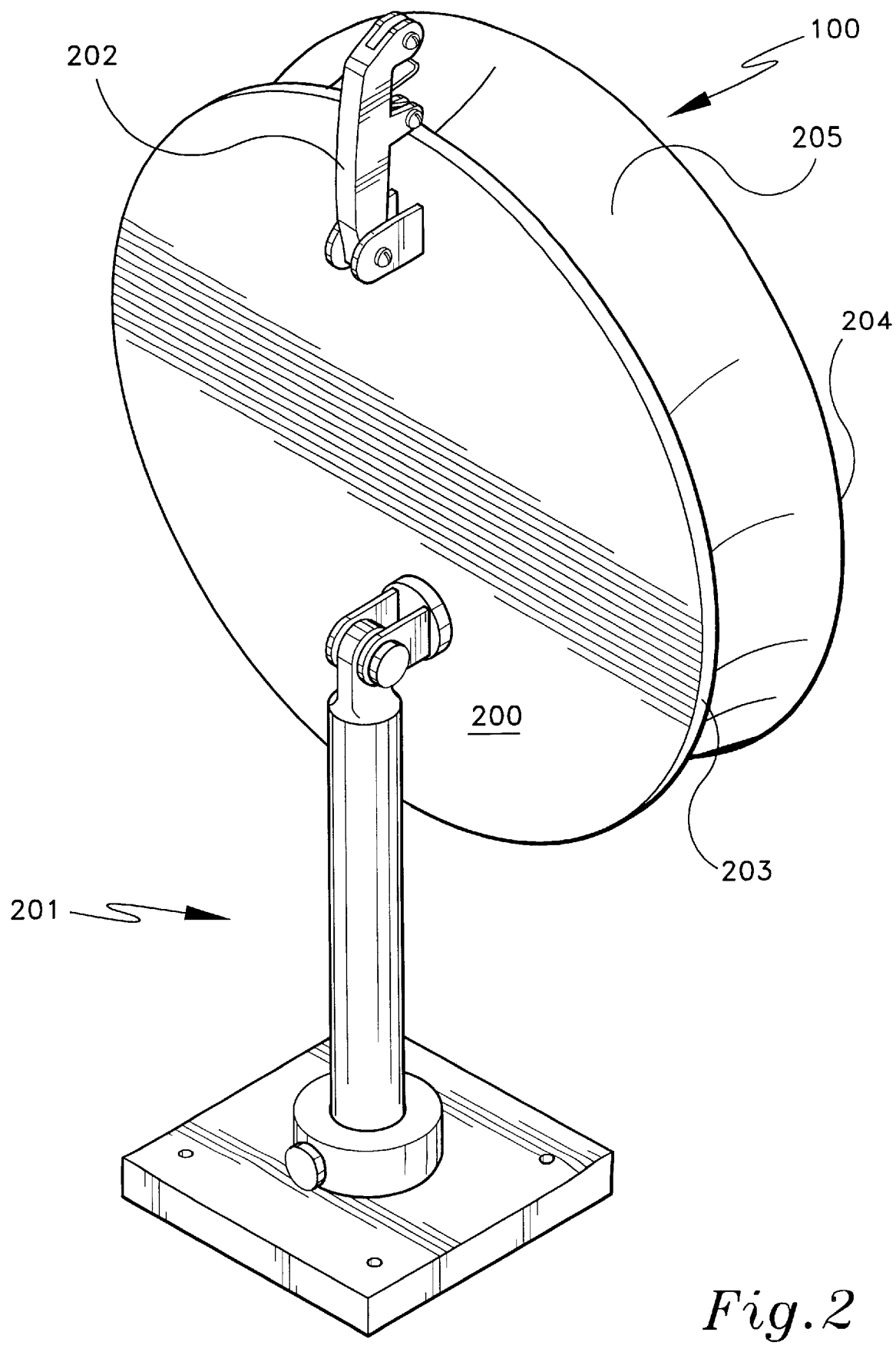
FIG. 2 is a perspective view of the delayed action fishing spool according to the present invention.
Figure 3:
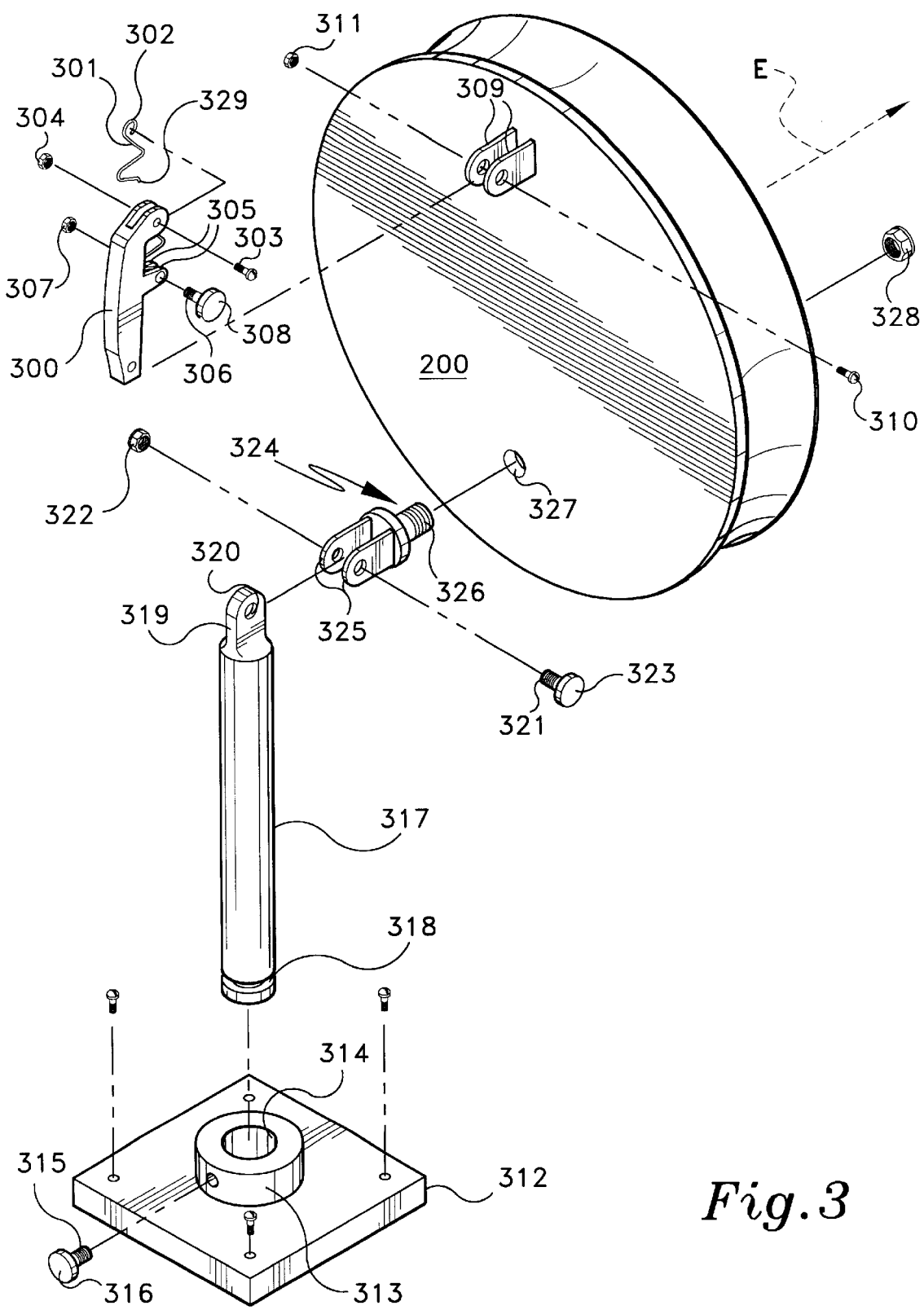
FIG. 3 is an exploded perspective view of the delayed action fishing spool showing the various elements thereof.

Details of the delayed action fishing spool 100 are shown in FIGS. 2 and 3, and include: a non-rotating, fishing line spool 200; a mount 201 for the non-rotating, fishing line spool 200; and a fishing line release clip 202. In use, the fishing line D is played out behind the boat A to tie desired trolling distance. A predetermined amount of the fishing line D is then wrapped around the nonrotating fishing line spool 200 and routed through the fishing line release clip 202. The predetermined amount of the fishing line D that is wrapped around the non-rotating, fishing line spool 200, determines the distance a fish may "run" with the bait, prior to tension being exerted on the line D by the fishing pole B and reel C. The spool 200 includes a rear flange 203, a front flange 204 and an inner, reduced diameter, curved portion 205 about which the line is wrapped.

The fishing line release clip 202 includes: a housing 300; a fishing line retaining wire 301 with a first end 302 having a loop therein and a second distal end 329; a screw 303 with a mating nut 304, the screw 303 acting as a pivot for the fishing line retaining wire 301; and an adjustable clamp comprised of tabs 305, threaded fastener 306 and mating nut 307. The clamp holds the second distal end 329 of the fishing line retaining wire 301 between tabs 305 with a force that is adjusted by turning knob 308 thereby loosening or tightening threaded fastener 306 on nut 307. The fishing line D is routed between the housing 300 and the fishing line retaining wire 301. The fishing line D remains in this position as long as the tension on the fishing line D is below a predetermined releasing tension level (this tension level being slightly above tension produced by the drag of the lure being pulled through the water). Once the tension on the fishing line D raises above the predetermined releasing tension level, the fishing line retaining wire 301 is pulled from between tabs 305. The fishing line retaining wire 301 then pivots about screw 303 releasing the fishing line D. The fishing line release clip 202 is attached to spool 200 via a bracket 309, screw 310 and mating nut 311. To assist in winding the predetermined amount of the fishing line D around the non-rotating, fishing line spool 200, the fishing line release clip 202 is pivoted around screw 310 to a lowered inoperative position.

The mount 201 adjustably attaches the non-rotating, fishing line spool to a surface (shown in FIG. 1 as the fantail of a boat A). A base 312 is screwed or otherwise attached to the surface, and has a cylindrical extension 313 with a vertical bore 314 therein. The bottom of vertical shaft 317 is held within the bore 314 by threaded fastener 315 which extends into groove 318. A knob 316 allows threaded fastener 315 to be loosened or tightened by hand. When threaded fastener 315 is tightened, the distal end of the fastener 315 contacts the bottom of groove 318 and inhibits rotation of the shaft 317. The fastener 315 can alternatively only be partially tightened, thereby allowing shaft 317 to rotate, but not allowing the bottom of the shaft 317 to come out of extension 313 (because the distal end of fastener 315 is still within the groove 318. The opposite or top end of the vertical shaft 317 has a tilting mechanism comprised of arm 319 with a bore 320 therethrough, spool support member 324, threaded fastener 321 and mating nut 322. The spool support member 324 includes a threaded portion 326 for extending through bore 327 in spool 200 and mating with nut 328. Spool support member 324 also includes a bracket 325 with a bore. Threaded fastener 321 includes a knob 323 that is turned to tighten or loosen fastener 321 to nut 322. By loosening fastener 321, spool support member 324 can pivot about fastener 321 to tilt spool 200 up and down relative to the base 312.

The above described mount 201 provides the ability to adjust the position of the spool 200 both horizontally (via the rotation of the shaft in the base and vertically (via the tilting mechanism). This is important because the predetermined amount of fishing line on the spool, comes off the spool 200 in the direction of axis E (similar to an open-faced reel). By allowing the fishing line to come off the spool in the direction of the axis E, frictional forces are kept to a minimum. The inherent frictional forces in the prior art devices (from rotating spool bearings, hook setting spring devices, etc.) can actually pull the bait from the mouth of the fish prior to the hook setting. The elimination of these frictional forces increases the probability that a fish that has taken the bait will actually swallow the bait. Once the predetermined amount of fishing line comes off the spool, the drag setting on the fishing reel C (in conjunction with the boat motor being in trolling gear) provides the necessary tension to set the hook.

It is to be understood that the present invention is not limited to the embodiment described above, but encompasses any and all embodiments within the scope of the following claims.

I claim:

1. A delayed action fishing spool for allowing a predetermined amount of fishing line to be played out prior to normal fishing tension being applied to the fishing line, said delayed action fishing spool comprising:

a non-rotating, fishing line spool, the predetermined amount of fishing line being wrapped around the circumference of said spool; and a fishing line release clip pivotally mounted to said non-rotating, fishing line spool, said fishing line release clip having a first operative position and a second inoperative position, said fishing line release clip being rotated to said second inoperative position to assist in loading the predetermined amount of fishing line on said non-rotating, fishing line spool, said fishing line release clip including a fishing line retaining wire having a first pivotally mounted end, a second distal end and a clamping means for holding said second distal end of said fishing line retaining wire, one end of the fishing line being routed through said fishing line release clip and retained therein by said fishing line retaining wire, such that said fishing line release clip releases the predetermined amount of fishing line from said non-rotating, fishing line spool when tension in the fishing line exceeds a predetermined releasing tension level;

said fishing line release clip further includes a releasing tension adjustment means having a threaded fastener for adjusting a force with which said clamping means holds said second distal end of said fishing line retaining wire, thereby establishing said predetermined releasing tension level, such that when the tension in the fishing line exceeds said predetermined releasing tension level, said clamping means releases said second distal end of said fishing line retaining wire, and said fishing line retaining wire rotates about said first pivotally mounted end of said fishing line retaining wire, thereby releasing the predetermined amount of fishing line from said non-rotating, fishing line spool.

2. The delayed action fishing spool as defined in claim 1, further comprising a mounting means for attaching said non-rotating, fishing line spool to a surface.

3. The delayed action fishing spool as defined in claim 2, wherein:

said non-rotating, fishing line spool includes a central axis, the predetermined amount of fishing wire being played out generally in the direction of said central axis;

said mounting means includes a base, a vertical support shaft rotatably mounted on said base, and a spool support member for attaching said non-rotating, fishing line spool to said vertical support shaft; and a horizontal component of the direction of said central axis is changed by rotating said vertical support shaft with respect to said base.

4. The delayed action fishing spool as defined in claim 3, wherein:

said vertical support shaft includes a top end, a bottom end and a circumferential groove adjacent said bottom end;

said base includes a cylindrical extension having a vertical bore and a horizontal threaded bore therein;

a threaded member with a first and second end is positioned within said horizontal threaded bore;

said bottom end of said vertical support shaft extends into said vertical bore; and said first end of said threaded member extends at least partially into said groove to retain said bottom end of said vertical support shaft within said vertical bore.

5. The delayed action fishing spool as defined in claim 4, wherein:

said second end of said threaded member includes a knob thereon for turning said threaded member and thereby adjusting the position of said threaded member within said horizontal threaded bore; and when said threaded member is tightened, said first end of said threaded member extends completely into said groove thereby inhibiting rotation of said vertical support shaft relative to said base.

6. The delayed action fishing spool as defined in claim 3, wherein:

said mounting means further includes tilt adjustment means for pivotally attaching said spool support member to said vertical support shaft; and a vertical component of the direction of said central axis is changed by said tilt adjustment means pivoting said spool support member relative to said vertical support shaft.

7. The delayed action fishing spool as defined in claim 6, wherein:

said tilt adjustment means includes a first bore in said vertical support shaft, a second bore in said spool support member, and a threaded fastener;

said threaded fastener includes a knob on a first end thereof, said knob tightening said threaded fastener when turned in a first direction and loosening said threaded fastener when turned in a second direction; and said threaded fastener allows said tilt adjustment means to pivot when said threaded fastener is loosened, and inhibits said tilt adjustment means from pivoting when said threaded fastener is tightened.

8. A fishing rig combination for trolling, said combination comprising:

a fishing pole;

a fishing reel;

a fishing line having a first end with a fishing bait thereon, and a second end attached to said fishing reel; and a delayed action fishing spool for allowing a predetermined amount of fishing line to be played out prior to normal fishing tension being applied to the fishing line, said delayed action fishing spool comprising:

a non-rotating, fishing line spool, the predetermined amount of fishing line being wrapped around the circumference of said spool; and a fishing line release clip pivotally mounted to said non-rotating, fishing line spool, said fishing line release clip having a first operative position and a second inoperative position, said fishing line release clip being rotated to said second inoperative position to assist in loading the predetermined amount of fishing line on said non-rotating, fishing line spool, said fishing line release clip including a fishing line retaining wire having a first pivotally mounted end, a second distal end, and a clamping means for holding said second distal end of said fishing line retaining wire, one end of the fishing line being routed through said fishing line release clip and retained therein by said fishing line retaining wire, such that said fishing line release clip releases the predetermined amount of fishing line from said non-rotating, fishing line spool when tension in the fishing line exceeds a predetermined releasing tension level;

said fishing line release clip further includes a releasing tension adjustment means having a threaded fastener for adjusting a force with which said clamping means holds said second distal end of said fishing line retaining wire, thereby establishing said predetermined releasing tension level, such that when the tension in the fishing line exceeds said predetermined releasing tension level, said clamping means releases said second distal end of said fishing line retaining wire, and said fishing line retaining wire rotates about said first pivotally mounted end of said fishing line retaining wire, thereby releasing the predetermined amount of fishing line from said non-rotating, fishing line spool.

9. The fishing rig combination as defined in claim 8, further comprising a mounting means for attaching said non-rotating, fishing line spool to a surface.

10. The fishing rig combination as defined in claim 9, wherein:

said non-rotating, fishing line spool includes a central axis, said predetermined amount of fishing wire being played out generally in the direction of said central axis;

said mounting means includes a base, a vertical support shaft rotatably mounted on said base, and a spool support member for attaching said non-rotating, fishing line spool to said vertical support shaft; and a horizontal component of the direction of said central axis is changed by rotating said vertical support shaft with respect to said base.

11. The fishing rig combination as defined in claim 10, wherein:
  said vertical support shaft includes a top end, a bottom end and a circumferential groove adjacent said bottom end;
  said base includes a cylindrical extension having a vertical bore and a horizontal threaded bore therein;
  a threaded member with a first and second end is positioned within said horizontal threaded bore;
  said bottom end of said vertical support shaft extends into said vertical bore; and
  said first end of said threaded member extends at least partially into said groove to retain said bottom end of said vertical support shaft within said vertical bore.

12. The fishing rig combination as defined in claim 11, wherein:
  said second end of said threaded member includes a knob thereon for turning said threaded member and thereby adjusting the position of said threaded member within said horizontal threaded bore; and
  when said threaded member is tightened, said first end of said threaded member extends completely into said groove thereby inhibiting rotation of said vertical support shaft relative to said base.

13. The fishing rig combination as defined in claim 10, wherein:
  said mounting means further includes tilt adjustment means for pivotally attaching said spool support member to said vertical support shaft; and
  a vertical component of the direction of said central axis is changed by said tilt adjustment means pivoting said spool support member relative to said vertical support shaft.

14. The fishing rig combination as defined in claim 13, wherein:
  said tilt adjustment means includes a first bore in said vertical support shaft, a second bore in said spool support member, and a threaded fastener;
  said threaded fastener includes a knob on a first end thereof, said knob tightening said threaded fastener when turned in a first direction and loosening said threaded fastener when turned in a second direction; and
  said threaded fastener allows said tilt adjustment means to pivot when said threaded fastener is loosened, and inhibits said tilt adjustment means from pivoting when said threaded fastener is tightened.

* * * * *